United States Patent
Anderson et al.

(10) Patent No.: US 11,733,553 B2
(45) Date of Patent: Aug. 22, 2023

(54) APPARATUS FOR REDUCTION OF POWER-DEPENDENT OPTICAL LOSS IN SILICON PHOTONIC DEVICES

(71) Applicant: MACOM Technology Solutions Holdings, Inc., Lowell, MA (US)

(72) Inventors: Sean P. Anderson, Macungie, PA (US); Hiroyuki Yamazaki, Allentown, PA (US)

(73) Assignee: MACOM Technology Solutions Holdings, Inc., Lowell, MA (US)

(*) Notice: Subject to any disclaimer, the term of this patent is extended or adjusted under 35 U.S.C. 154(b) by 0 days.

(21) Appl. No.: 17/233,018

(22) Filed: Apr. 16, 2021

(65) Prior Publication Data
US 2022/0334417 A1    Oct. 20, 2022

(51) Int. Cl.
*G02F 1/025*    (2006.01)
*G02B 6/122*    (2006.01)
*G02B 6/12*     (2006.01)

(52) U.S. Cl.
CPC ............. *G02F 1/025* (2013.01); *G02B 6/122* (2013.01); *G02B 2006/12061* (2013.01); *G02B 2006/12097* (2013.01)

(58) Field of Classification Search
CPC ............ G02F 1/025; G02B 6/122; G02B 2006/12061; G02B 2006/12097; G02B 6/12; G02B 2006/12085; G02B 2006/121
See application file for complete search history.

(56) References Cited

U.S. PATENT DOCUMENTS

2022/0252783 A1*    8/2022    Zhang .................... G02B 6/276

OTHER PUBLICATIONS

R. Claps, et al., "Influence of nonlinear absorption on Rama amplification in Silicon waveguides", Optics Express 2774, Jun. 14, 2004, vol. 12, No. 12; 7 pages.
Stefano Grillanda and Francesco Morichetti, "Light-induced metal-like surface of silicon photonic waveguides", Nature Communications, Sep. 11, 2015; 6 pages.
D. Dimitropoulos, et al., "Lifetime of photogenerated carriers in silicon-on-insulator rib waveguides", Applied Physics Letters, 86, 071115 (2005), Feb. 10, 2005; 3 pages.
Top View of ridge waveguide from the PDK of GlobalFoundries in East Fishkill, NY (available prior to Apr. 16, 2021); 1 page.

* cited by examiner

*Primary Examiner* — John Bedtelyon
(74) *Attorney, Agent, or Firm* — Faegre Drinker Biddle & Reath LLP

(57) ABSTRACT

Optical waveguides may include a substrate and a silicon based optical waveguide supported on the substrate. The silicon based optical waveguide may include a central ridge portion and a plurality of spaced apart wing portions connected through connecting portions. The number of wing portions may be greater than two. The central ridge portion may have a central ridge lateral width extent greater than a lateral width extent of at least one of the wing portions. Optical waveguides may include a substrate, a silicon based optical waveguide supported on the substrate, and a concentrator supported on the substrate and positioned within a lateral width extent of the silicon based optical waveguide and outside of a height extent of the silicon based optical waveguide. The optical waveguides may be included as part of an optical modulator.

8 Claims, 7 Drawing Sheets

APPARATUS FOR REDUCTION OF POWER-DEPENDENT OPTICAL LOSS IN SILICON PHOTONIC DEVICES

FIELD

The present disclosure relates to semiconductor photonic devices and in particular to silicon based photonic devices, such as waveguides and modulators.

BACKGROUND

In silicon photonics, silicon used to carry light is supported on top of a layer of silica and is known as silicon on insulator (SOI). Referring to FIG. 1, a conventional silicon waveguide 10 is shown. An insulator 12 is etched to form a rib 14 of silicon which guides light (see the light intensity plot 20 in FIG. 2). Rib 14 has a width di between a first sidewall 16 and a second sidewall 18. As shown in FIG. 2, a large portion of the optical mode is exposed to the etched sidewalls 16, 18 of rib 14.

In the process of etching crystalline Si to form rib 14, dangling covalent bonds are created at the etched sidewalls 16, 18. When these dangling covalent bonds absorb light, they generate free carriers, which contribute to optical loss. The generation rate of free carriers is proportional to the optical power inside the waveguide. This leads to a quadratic dependence of total waveguide loss on optical power, and is commonly known as power-dependent loss.

The higher the loss in a given component of a silicon photonics chip (PIC) requires higher power levels, tighter design constraints on other components on the PIC, reduced bandwidth, lower PIC output, reduced receiver sensitivity, and other effects. Therefore, a need exists to reduce the optical loss when possible to reduce these and other negative effects.

SUMMARY

In an exemplary embodiment of the present disclosure, an optical waveguide for carrying light is provided. The optical waveguide comprising a substrate and a silicon based optical waveguide supported on the substrate. The silicon based optical waveguide comprising: a central ridge portion having a central ridge lateral width extent bounded by a first central ridge sidewall and a second central ridge sidewall and a central ridge height extent bounded by a central ridge bottom face and a central ridge top face; a left wing ridge portion having a left wing ridge lateral width extent bounded by a first left wing sidewall and a second left wing sidewall and a left wing ridge height extent bounded by a left wing ridge bottom face and a left wing ridge top face; a right wing ridge portion having a right wing ridge lateral width extent bounded by a first right wing sidewall and a second right wing sidewall and a right wing ridge height extent bounded by a right wing ridge bottom face and a right wing ridge top face; a left connecting portion connecting the central ridge portion and the left wing ridge portion, the left connecting portion having a left connecting portion height extent bounded by a left connecting portion bottom face and a left connecting portion top face; a right connecting portion connecting the central ridge portion and the right wing ridge portion, the right connecting portion having a right connecting portion height extent bounded by a right connecting portion bottom face and a right connecting portion top face; a second left wing ridge portion having a second left wing ridge lateral width extent bounded by a first second left wing sidewall and a second second left wing sidewall and a second left wing ridge height extent bounded by a second left wing ridge bottom face and a second left wing ridge top face; a second right wing ridge portion having a second right wing ridge lateral width extent bounded by a first second right wing sidewall and a second second right wing sidewall and a second right wing ridge height extent bounded by a second right wing ridge bottom face and a second right wing ridge top face; a second left connecting portion connecting the left wing portion and the second left wing ridge portion, the second left connecting portion having a second left connecting portion height extent bounded by a second left connecting portion bottom face and a second left connecting portion top face; and a second right connecting portion connecting the right wing ridge portion and the second right wing ridge portion, the second right connecting portion having a second right connecting portion height extent bounded by a second right connecting portion bottom face and a second right connecting portion top face. The central ridge height extent and the left wing ridge height extent are both greater than the left connecting portion height extent and the central ridge height extent and the right wing ridge height extent are both greater than the right connecting portion height extent. The second left wing ridge height extent and the second left wing ridge height extent are both greater than the second left connecting portion height extent and the right wing ridge height extent and the second right wing ridge height extent are both greater than the second right connecting portion height extent.

In an example thereof, the central ridge bottom face, the left wing ridge bottom face, the right wing ridge bottom face, the left connecting portion bottom face, and the right connecting portion bottom face, the second left wing ridge bottom face, the second right wing ridge bottom face, the second left connecting portion bottom face, and the second right connecting portion bottom face form a planar bottom face of the silicon based optical waveguide.

In another example thereof, the central ridge top face and the left wing ridge top face are coplanar. In a variation thereof, the right wing ridge top face and the left wing ridge top face are coplanar.

In a further example thereof, the right wing ridge top face and the left wing ridge top face are coplanar.

In yet another example thereof, the left wing ridge top face and the second left wing ridge top face are coplanar.

In still another example thereof, the right wing ridge top face and the second right wing ridge top face are coplanar.

In yet a further example thereof, the second right wing ridge top face and the second left wing ridge top face are coplanar.

In still a further example thereof, the central ridge lateral width extent is greater than each of the left wing ridge lateral width extent and the right wing ridge lateral width extent.

In yet still another example thereof, a first separation between the central ridge portion and the left wing ridge portion is at least 250 nm.

In a further yet still example thereof, a second separation between the central ridge portion and the right wing ridge portion is at least 250 nm.

In another yet example thereof, a first separation between the left wing ridge portion and the second left wing ridge portion is at least 100 nm.

In additional example thereof, a second separation between the right wing ridge portion and the second right wing ridge portion is at least 100 nm.

In yet a further additional example thereof, a concentrator supported on the substrate and positioned within the central ridge lateral width extent of the central ridge portion of the silicon based optical waveguide and outside of the central ridge height extent of the central ridge portion of the silicon based optical waveguide, the concentrator having a concentrator lateral width extent bounded by a first concentrator sidewall and a second concentrator sidewall and a concentrator height extent bounded by a concentrator bottom face and a concentrator top face. In a variation thereof, the silicon based optical waveguide is a first material and the concentrator is a second material different from the first material. In another variation thereof, the second material is silicon nitride. In a further variation thereof, the concentrator is patterned on top of the silicon based optical waveguide. In yet a further variation thereof, the concentrator is separated from the silicon based optical waveguide by a spacer layer. In a still further variation thereof, the first central ridge portion sidewall and the second central ridge portion sidewall are both etched sidewalls. In yet a still further variation thereof, a ratio of the central ridge lateral width extent of the silicon based optical waveguide to the concentrator lateral width extent of the concentrator is greater than 1:1 In an additional variation thereof, the ratio is at least 2:1.

In another exemplary embodiment of the present disclosure, an optical waveguide for carrying light is provided. The optical waveguide comprising a substrate and a silicon based optical waveguide supported on the substrate. The silicon based optical waveguide comprising a central ridge portion having a central ridge lateral width extent bounded by a first central ridge sidewall and a second central ridge sidewall and a central ridge height extent bounded by a central ridge bottom face and a central ridge top face; a left wing ridge portion having a left wing ridge lateral width extent bounded by a first left wing sidewall and a second left wing sidewall and a left wing ridge height extent bounded by a left wing ridge bottom face and a left wing ridge top face, the central ridge lateral width extent being greater than the left wing ridge lateral width extent; a right wing ridge portion having a right wing ridge lateral width extent bounded by a first right wing sidewall and a second right wing sidewall and a right wing ridge height extent bounded by a right wing ridge bottom face and a right wing ridge top face, the central ridge lateral width extent being greater than the right wing ridge lateral width extent; a left connecting portion connecting the central ridge portion and the left wing ridge portion, the left connecting portion having a left connecting portion height extent bounded by a left connecting portion bottom face and a left connecting portion top face; and a right connecting portion connecting the central ridge portion and the right wing ridge portion, the right connecting portion having a right connecting portion height extent bounded by a right connecting portion bottom face and a right connecting portion top face. The central ridge height extent and the left wing ridge height extent are both greater than the left connecting portion height extent and the central ridge height extent and the right wing ridge height extent are both greater than the right connecting portion height extent.

In an example thereof, the central ridge bottom face, the left wing ridge bottom face, the right wing ridge bottom face, the left connecting portion bottom face, and the right connecting portion bottom face form a planar bottom face of the silicon based optical waveguide.

In another example thereof, the central ridge top face and the left wing ridge top face are coplanar. In a variation thereof, the right wing ridge top face and the left wing ridge top face are coplanar.

In a further example thereof, the right wing ridge top face and the left wing ridge top face are coplanar.

In yet another example thereof, the left wing ridge top face and the second left wing ridge top face are coplanar.

In still another example thereof, the right wing ridge top face and the second right wing ridge top face are coplanar.

In yet a further example thereof, the second right wing ridge top face and the second left wing ridge top face are coplanar.

In still a further example thereof, the central ridge lateral width extent is greater than each of the left wing ridge lateral width extent and the right wing ridge lateral width extent.

In yet still another example thereof, a first separation between the central ridge portion and the left wing ridge portion is at least 250 nm.

In a further yet still example thereof, a second separation between the central ridge portion and the right wing ridge portion is at least 250 nm.

In yet a further additional example thereof, a concentrator supported on the substrate and positioned within the central ridge lateral width extent of the central ridge portion of the silicon based optical waveguide and outside of the central ridge height extent of the central ridge portion of the silicon based optical waveguide, the concentrator having a concentrator lateral width extent bounded by a first concentrator sidewall and a second concentrator sidewall and a concentrator height extent bounded by a concentrator bottom face and a concentrator top face. In a variation thereof, the silicon based optical waveguide is a first material and the concentrator is a second material different from the first material. In another variation thereof, the second material is silicon nitride. In a further variation thereof, the concentrator is patterned on top of the silicon based optical waveguide. In yet a further variation thereof, the concentrator is separated from the silicon based optical waveguide by a spacer layer. In a still further variation thereof, the first central ridge portion sidewall and the second central ridge portion sidewall are both etched sidewalls. In yet a still further variation thereof, a ratio of the central ridge lateral width extent of the silicon based optical waveguide to the concentrator lateral width extent of the concentrator is greater than 1:1 In an additional variation thereof, the ratio is at least 2:1.

In a further exemplary embodiment of the present disclosure, an optical waveguide for carrying light is provided. The optical waveguide comprising a substrate; a silicon based optical waveguide supported on the substrate having a first lateral width extent bounded by a first sidewall and a second sidewall and a first height extent bounded by a first bottom face and a first top face, the silicon based optical waveguide being a first material; and a concentrator supported on the substrate and positioned within the first lateral width extent of the silicon based optical waveguide and outside of the first height extent of the silicon based optical waveguide. The concentrator having a second lateral width extent bounded by a third sidewall and a fourth sidewall and a first height extent bounded by a second bottom face and a second top face. The concentrator being a second material different from the first material.

In an example thereof, the concentrator is patterned on top of the silicon based optical waveguide.

In another example thereof, the concentrator is separated from the silicon based optical waveguide by a spacer layer.

In a further example thereof, the first sidewall and the second sidewall are both etched sidewalls.

In yet a further example thereof, a ratio of the first lateral width extent of the silicon based optical waveguide to the second lateral width extent of the concentrator is greater than 1:1. In a variation thereof, the ratio is at least 2:1.

In still a further example thereof, the second material is silicon nitride.

In a further still exemplary embodiment of the present disclosure, an optical modulator for use with a radio frequency driver is provided. The optical modulator comprising a substrate and a silicon based optical waveguide supported on the substrate having a first lateral width extent bounded by a first sidewall and a second sidewall and a first height extent bounded by a first bottom face and a first top face. The silicon based optical waveguide having a central optical guide portion being a first material, a p-doped portion to a first side of the central optical guide portion, and an n-doped portion to a second side of the central optical guide portion. The optical modulator further comprising a first electrical contact adapted to operatively couple the radio frequency driver to the p-doped portion of the silicon based optical waveguide; a second electrical contact adapted to operatively couple the radio frequency driver to the n-doped portion of the silicon based optical waveguide; and a concentrator supported on the substrate and positioned within the first lateral width extent of the silicon based optical waveguide and outside of the first height extent of the silicon based optical waveguide. The concentrator having a second lateral width extent bounded by a third sidewall and a fourth sidewall and a first height extent bounded by a second bottom face and a second top face, the concentrator being a second material different from the first material.

In an example thereof, the concentrator is patterned on top of the silicon based optical waveguide.

In another example thereof, the concentrator is separated from the silicon based optical waveguide by a spacer layer.

In a further example thereof, the concentrator is positioned within a lateral width of the central optical guide portion of the silicon based optical waveguide. In a variation thereof, a ratio of the lateral width extent of the central optical guide portion of the silicon based optical waveguide to the second lateral width extent of the concentrator is greater than 1:1. In another variation thereof, the second material is silicon nitride.

BRIEF DESCRIPTION OF THE DRAWINGS

The above-mentioned and other features and advantages of this disclosure, and the manner of attaining them, will become more apparent and will be better understood by reference to the following description of exemplary embodiments taken in conjunction with the accompanying drawings, wherein.

Corresponding reference characters indicate corresponding parts throughout the several views. The exemplification set out herein illustrates an exemplary embodiment of the invention and such exemplification is not to be construed as limiting the scope of the invention in any manner.

DETAILED DESCRIPTION OF THE DRAWINGS

Figure 1:
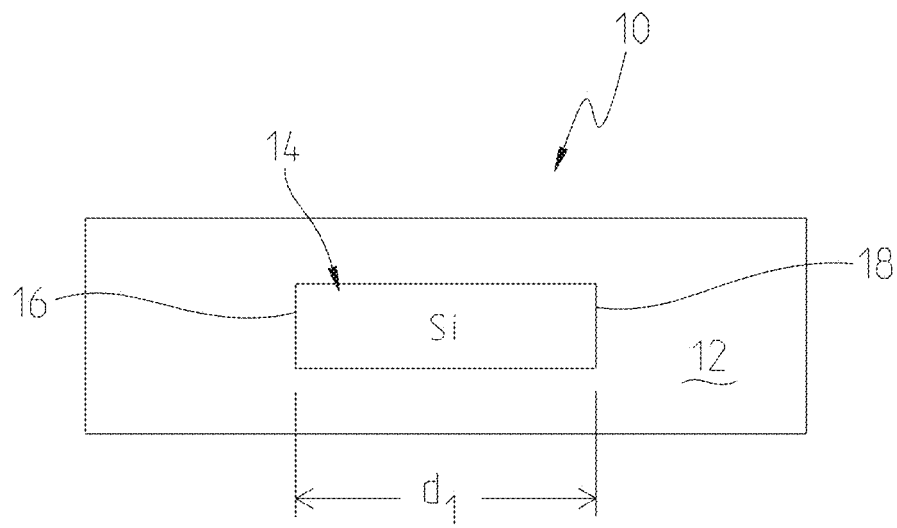
FIG. 1 illustrates a lateral cross-sectional view of a conventional silicon optical waveguide.
Figure 2:
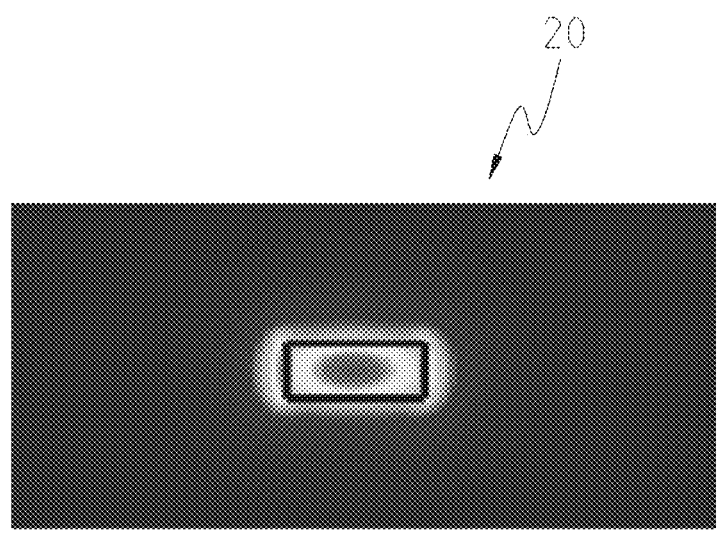
FIG. 2 illustrates a simulated lateral cross-sectional light intensity plot of light propagating along the length of the optical waveguide of FIG. 1.

For the purposes of promoting an understanding of the principles of the present disclosure, reference is now made to the embodiments illustrated in the drawings, which are described below. The embodiments disclosed herein are not intended to be exhaustive or limit the present disclosure to the precise form disclosed in the following detailed description. Rather, the embodiments are chosen and described so that others skilled in the art may utilize their teachings. Therefore, no limitation of the scope of the present disclosure is thereby intended. Corresponding reference characters indicate corresponding parts throughout the several views.

The terms "couples", "coupled", "coupler" and variations thereof are used to include both arrangements wherein the two or more components are in direct physical contact and arrangements wherein the two or more components are not in direct contact with each other (e.g., the components are "coupled" via at least a third component), but yet still cooperate or interact with each other.

In some instances throughout this disclosure and in the claims, numeric terminology, such as first, second, third, and fourth, is used in reference to various components or features. Such use is not intended to denote an ordering of the components or features. Rather, numeric terminology is used to assist the reader in identifying the component or features being referenced and should not be narrowly interpreted as providing a specific order of components or features.

Figure 3:
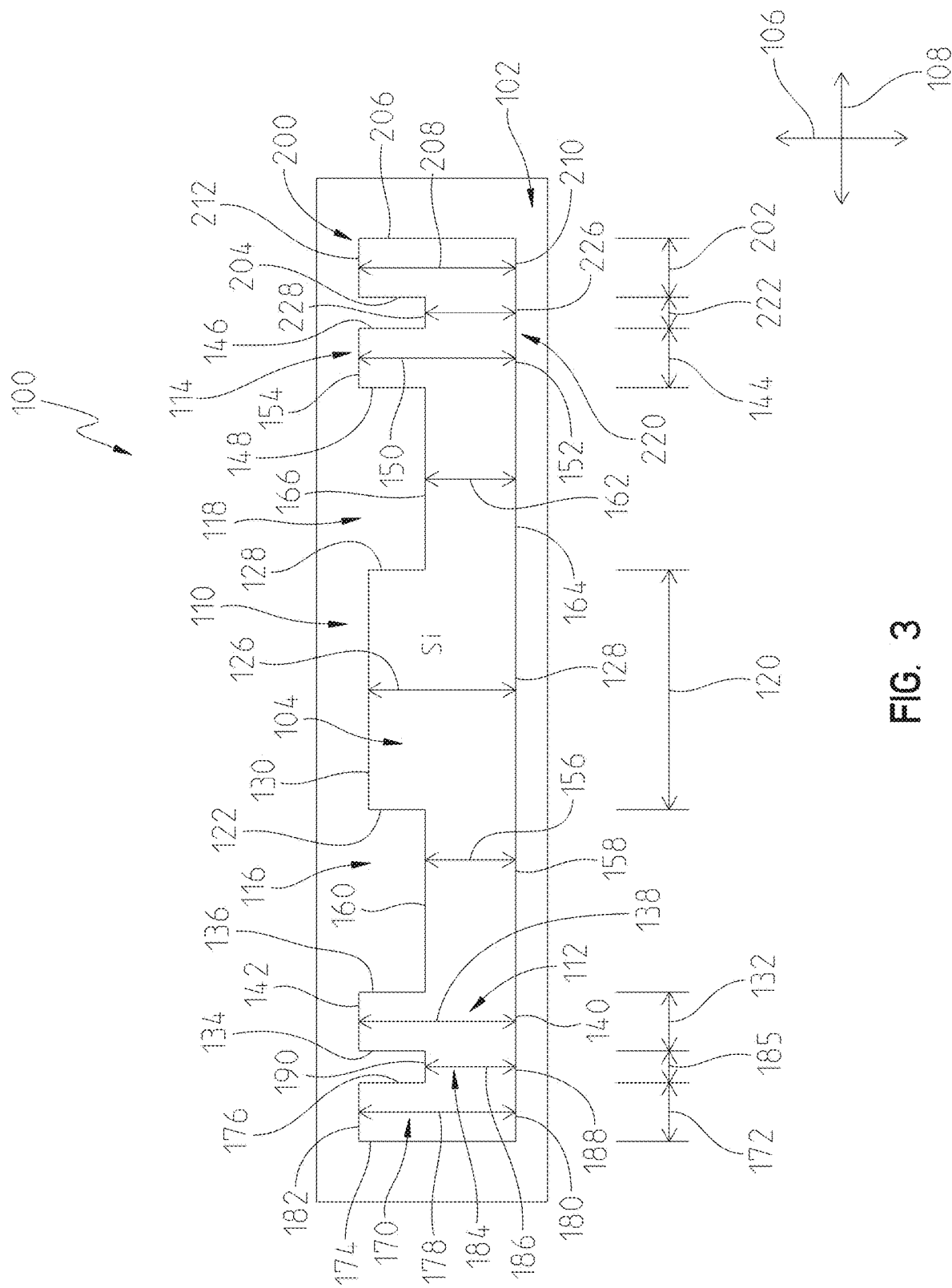
FIG. 3 illustrates a lateral cross-sectional view of a first exemplary optical waveguide of the present disclosure.

Referring to FIG. 3, a representative view of an optical waveguide 100 is illustrated. FIG. 3 is a lateral cross-sectional view of optical waveguide 100. Optical waveguide 100 includes a substrate 102 and silicon based optical waveguide 104 supported on substrate 102. Silicon based optical waveguide 104 guides light (see the light intensity plot 192 in FIG. 4).

In embodiments, silicon based optical waveguide 104 is made from a first material selected from any suitable semiconductor material suitable to guiding optical radiation. Exemplary materials and dopants include Si, GaAs, LiNbO3, InP, AlGaAs, electro-optic polymer. Exemplary wavelengths of light compatible with the listed exemplary materials or other exemplary materials include 800-980 nm, 1260-1360 nm, 1530-1565 nm, and 1565-1670 nm. For the simulation shown in FIG. 4, the first material of silicon based optical waveguide 104 is Silicon and the surrounding material of substrate 102 is Silicon dioxide.

In embodiments, silicon based optical waveguide 104 has a constant lateral cross-section along a longitudinal length of optical waveguide 100. In embodiments, silicon based optical waveguide 104 has a varying lateral cross-section along a longitudinal length of optical waveguide 100. Exemplary varying lateral cross-sections include a tapered silicon based optical waveguide 104 which changes in a linear fashion in one or both of a vertical extent along axis 106 and a horizontal extent along axis 108. In examples, although the lateral cross-section of silicon based optical waveguide 104 varies, the proportions of the features of silicon based optical waveguide 104 remain the same throughout the longitudinal length of optical waveguide 100. In embodiments, silicon based optical waveguide 104 has at least one longitudinal portion having a constant lateral cross-section and at least one longitudinal portion having a varying lateral cross-section along a longitudinal length of optical waveguide 100.

Silicon based optical waveguide 104 includes a central ridge portion 110, a left wing ridge portion 112, a right wing ridge portion 114, a left connecting portion 116, and a right connecting portion 118. Left connecting portion 116 connects central ridge portion 110 and left wing ridge portion 112. Right connecting portion 118 connects central ridge portion 110 and right wing ridge portion 114. Central ridge portion 110 has a central ridge lateral width extent 120 bounded by a first central ridge sidewall 122 and a second central ridge sidewall 124 and a central ridge height extent 126 bounded by a central ridge bottom face 128 and a central ridge top face 130. Left wing ridge portion 112 has a left wing ridge lateral width extent 132 bounded by a first left wing sidewall 134 and a second left wing sidewall 136 and a left wing ridge height extent 138 bounded by a left wing ridge bottom face 140 and a left wing ridge top face 142. Right wing ridge portion 114 has a right wing ridge lateral width extent 144 bounded by a first right wing sidewall 146 and a second right wing sidewall 148 and a right wing ridge height extent 150 bounded by a right wing ridge bottom face 152 and a right wing ridge top face 154. Left connecting portion 116 has a left connecting portion height extent 156 bounded by a left connecting portion bottom face 158 and a left connecting portion top face 160. Right connecting portion 118 has a right connecting portion height extent 162 bounded by a right connecting portion bottom face 164 and a right connecting portion top face 166. Central ridge height extent 126 and left wing ridge height extent 138 are both greater than left connecting portion height extent 156 and central ridge height extent 126 and right wing ridge height extent 150 are both greater than right connecting portion height extent 162.

In embodiments, silicon based optical waveguide 104 terminates at first left wing sidewall 134 of left wing ridge portion 112 and first right wing sidewall 146 of right wing ridge portion 114. In the illustrated embodiment, central ridge bottom face 128, left wing ridge bottom face 140, right wing ridge bottom face 152, left connecting portion bottom face 158, and right connecting portion bottom face 164 form a planar bottom face of silicon based optical waveguide 104. In embodiments, one or more of left wing ridge bottom face 140, right wing ridge bottom face 152, left connecting portion bottom face 158, and right connecting portion bottom face 164 are offset from central ridge bottom face 128. In the illustrated embodiment, central ridge top face 130 and left wing ridge top face 142 are coplanar. Further, right wing ridge top face 154 and left wing ridge top face 142 are coplanar.

In the illustrated embodiment of FIG. 3, silicon based optical waveguide 104 includes additional wing portions, illustratively two additional wing portions. In embodiments, further additional wing portions are provided. In the illustrated embodiment of FIG. 3, silicon based optical waveguide 104 includes a second left wing ridge portion 170 having a second left wing ridge lateral width extent 172 bounded by sidewall 174 and sidewall 176 and a second left wing ridge height extent 178 bounded by a second left wing ridge bottom face 180 and a second left wing ridge top face 182. Second left wing ridge portion 170 is connected to left wing ridge portion 112 through a connecting portion 184 having a lateral extent 185 and a height extent 186 which is bounded by a bottom face 188 and a top face 190. silicon based optical waveguide 104 further includes a second right wing ridge portion 200 having a second right wing ridge lateral width extent 202 bounded by sidewall 204 and sidewall 206 and a second right wing ridge height extent 208 bounded by a second left wing ridge bottom face 210 and a second left wing ridge top face 212. Second right wing ridge portion 200 is connected to right wing ridge portion 114 through a connecting portion 220 having a lateral extent 222 and a height extent 224 which is bounded by a bottom face 226 and a top face 228.

In the illustrated embodiment, left wing ridge height extent 138 and second left wing ridge height extent 178 are both greater than height extent 186 and right wing ridge height extent 150 and second right wing ridge height extent 208 are both greater than height extent 224. In the illustrated embodiment, left wing ridge top face 142 of left wing ridge portion 112 and second left wing ridge top face 182 of second left wing ridge portion 170 are coplanar. In embodiments, left wing ridge top face 142 of left wing ridge portion 112 is offset relative to second left wing ridge top face 182 of second left wing ridge portion 170. In the illustrated embodiment, right wing ridge top face 154 of right wing ridge portion 114 and second left wing ridge top face 212 of second right wing ridge portion 200 are coplanar. In embodiments, right wing ridge top face 154 of right wing ridge portion 114 is offset relative to second left wing ridge top face 212 of second right wing ridge portion 200. In the illustrated embodiment, second left wing ridge top face 182 of second left wing ridge portion 170 and second left wing ridge top face 212 of second right wing ridge portion 200 are coplanar. In embodiments, second left wing ridge top face 182 of second left wing ridge portion 170 is offset relative to second left wing ridge top face 212 of second right wing ridge portion 200.

In embodiments, a lateral separation between central ridge portion 110 and each of left wing ridge portion 112 and right wing ridge portion 114 is equal to central ridge lateral width extent 120 of central ridge portion 110. In embodiments, a lateral separation between central ridge portion 110 and each of left wing ridge portion 112 and right wing ridge portion 114 is at least 250 nanometers (nm). In embodiments, a lateral separation between each pair of left wing ridge portion 112 and second left wing ridge portion 170 and of right wing ridge portion 114 and second right wing ridge portion 200 is at least 100 nm.

Figure 4:
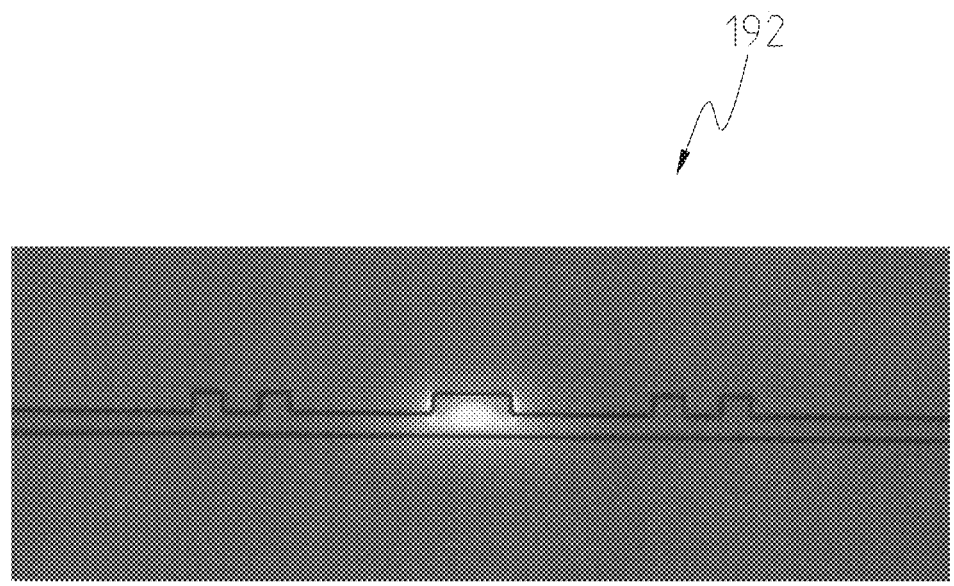
FIG. 4 illustrates a simulated lateral cross-sectional light intensity plot of light propagating along the length of the optical waveguide of FIG. 3.

Referring to FIG. 4, a simulated light intensity plot 192 for optical waveguide 100 is shown. As shown in light intensity plot 192, light is guided by left wing ridge portion 112 of optical waveguide 100. The geometry of optical waveguide 100 permits free carriers generated by surface states of optical waveguide 100 to diffuse over a large area. For example, left wing ridge portion 112 and right wing ridge portion 114 and optionally second left wing ridge portion 170 and second right wing ridge portion 200 provide a large surface area and volume over which generated carriers may diffuse away from the optical mode of left wing ridge portion 112; thereby reducing the carrier density near the optical mode. This geometry may also lead to a greater carrier recombination rate and a reduction in power-dependent loss.

Figure 5:
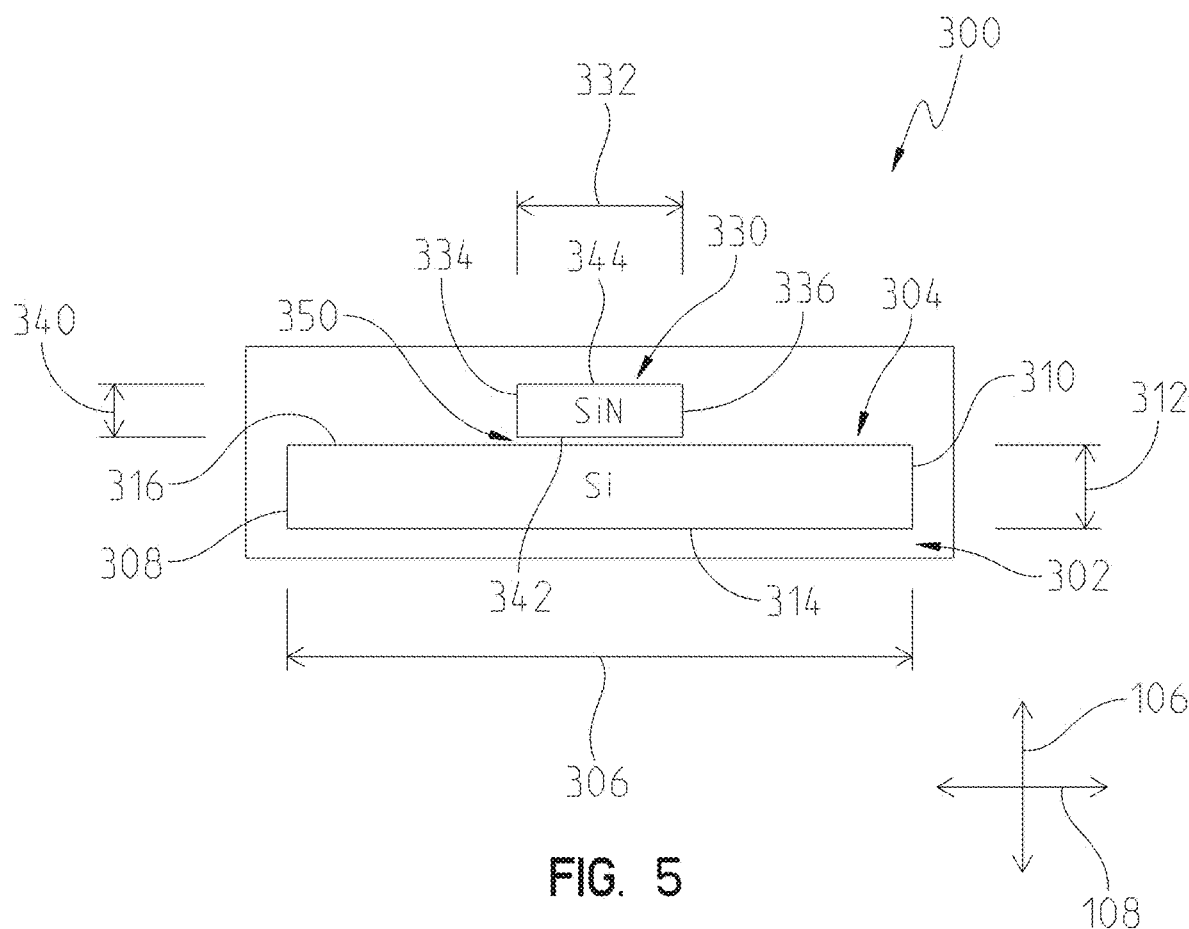
FIG. 5 illustrates a lateral cross-sectional view of a second exemplary optical waveguide of the present disclosure.
Figure 6:
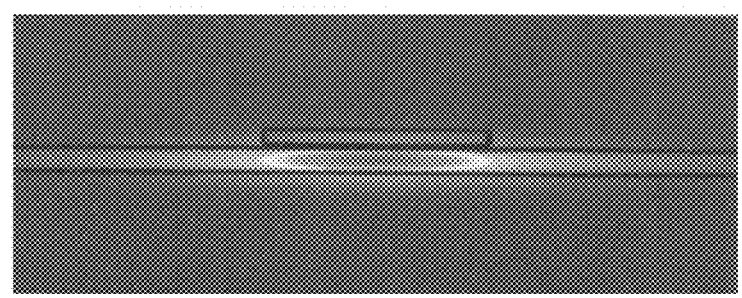
FIG. 6 illustrates a simulated lateral cross-sectional light intensity plot of light propagating along the length of the optical waveguide of FIG. 5.

Referring to FIG. 5, a representative view of an optical waveguide 300 is illustrated. FIG. 6 is a lateral cross-sectional view of optical waveguide 300. optical waveguide 300 includes a substrate 302 and silicon based optical waveguide 304 supported on substrate 302. silicon based optical waveguide 304 guides light (see the light intensity plot 392 in FIG. 4).

In embodiments, silicon based optical waveguide 304 is made from a first material selected from any suitable semiconductor material suitable to guiding optical radiation. Exemplary materials and dopants include Si, GaAs, LiNbO3, InP, AlGaAs, electro-optic polymer. Exemplary wavelengths of light compatible with the listed exemplary materials or other exemplary materials include 800-980 nm, 1260-1360 nm, 1530-1565 nm, and 1565-1670 nm. For the simulation shown in FIG. 6, the first material of silicon based optical waveguide 304 is Silicon and the surrounding material of substrate 302 is Silicon dioxide.

In embodiments, silicon based optical waveguide 304 has a constant lateral cross-section along a longitudinal length of optical waveguide 300. In embodiments, silicon based optical waveguide 304 has a varying lateral cross-section along a longitudinal length of optical waveguide 300. Exemplary varying lateral cross-sections include a tapered silicon based optical waveguide 304 which changes in a linear fashion in one or both of a vertical extent along axis 106 and a horizontal extent along axis 108. In examples, although the lateral cross-section varies, the proportions of the features of optical waveguide 300 remain the same throughout the longitudinal length of optical waveguide 300. In embodiments, silicon based optical waveguide 304 has at least one longitudinal portion having a constant lateral cross-section and at least one longitudinal portion having a varying lateral cross-section along a longitudinal length of optical waveguide 300.

Referring to FIG. 5, silicon based optical waveguide 304 a lateral width extent 306 bounded by a first sidewall 308 and a second sidewall 310 and a height extent 312 bounded by a bottom face 314 and a top face 316. In the illustrated embodiment, silicon based optical waveguide 304 is not full width, but rather has etched sidewalls 308 and 310. In embodiments, substrate 302 is full width, and sidewalls 308 and 310 correspond to the outer extent of optical waveguide 300.

Optical waveguide 300 further includes a concentrator 330 supported on substrate 302 and positioned within lateral width extent 306 of silicon based optical waveguide 304 and outside of height extent 312 of silicon based optical waveguide 304. Concentrator 330 has a lateral width extent 332 bounded by a sidewall 334 and a sidewall 336 and a height extent 340 bounded by a bottom face 342 and a top face 344. In embodiments, height extent 340 is in the range of 80-100 nanometers (nm). In embodiments, a ratio of lateral width extent 306 of silicon based optical waveguide 304 to lateral width extent 332 of concentrator 330 is greater than 1:1. In examples, the ratio is at least 2:1. In embodiments, concentrator 330 is patterned directly on top of silicon based optical waveguide 304. In the illustrated embodiment, concentrator 330 is spaced apart from silicon based optical waveguide 304 with a spacer layer 350. In embodiments, concentrator 330 has a thickness in the range of 200-400 nm and a width of 300-1000 nm.

Silicon based optical waveguide 304 is made of a first material while concentrator 330 is made of a second material, the second material being different than the first material. In the illustrated embodiment, silicon based optical waveguide 304 is made of Silicon (Si) and concentrator 330 is made of silicon nitride (SiN). Other exemplary materials may be used.

Concentrator 330 assists in concentrating the optical mode of silicon based optical waveguide 304 to the region generally directly below concentrator 330 as shown in light intensity plot 392. Concentrator 330 does not transport the optical energy itself. By concentrating the optical mode, the interactions with first sidewall 308 and second sidewall 310 of silicon based optical waveguide 304 is reduced. This lowers the free carrier generation rate and thus reduces power-dependent loss.

Figure 7:
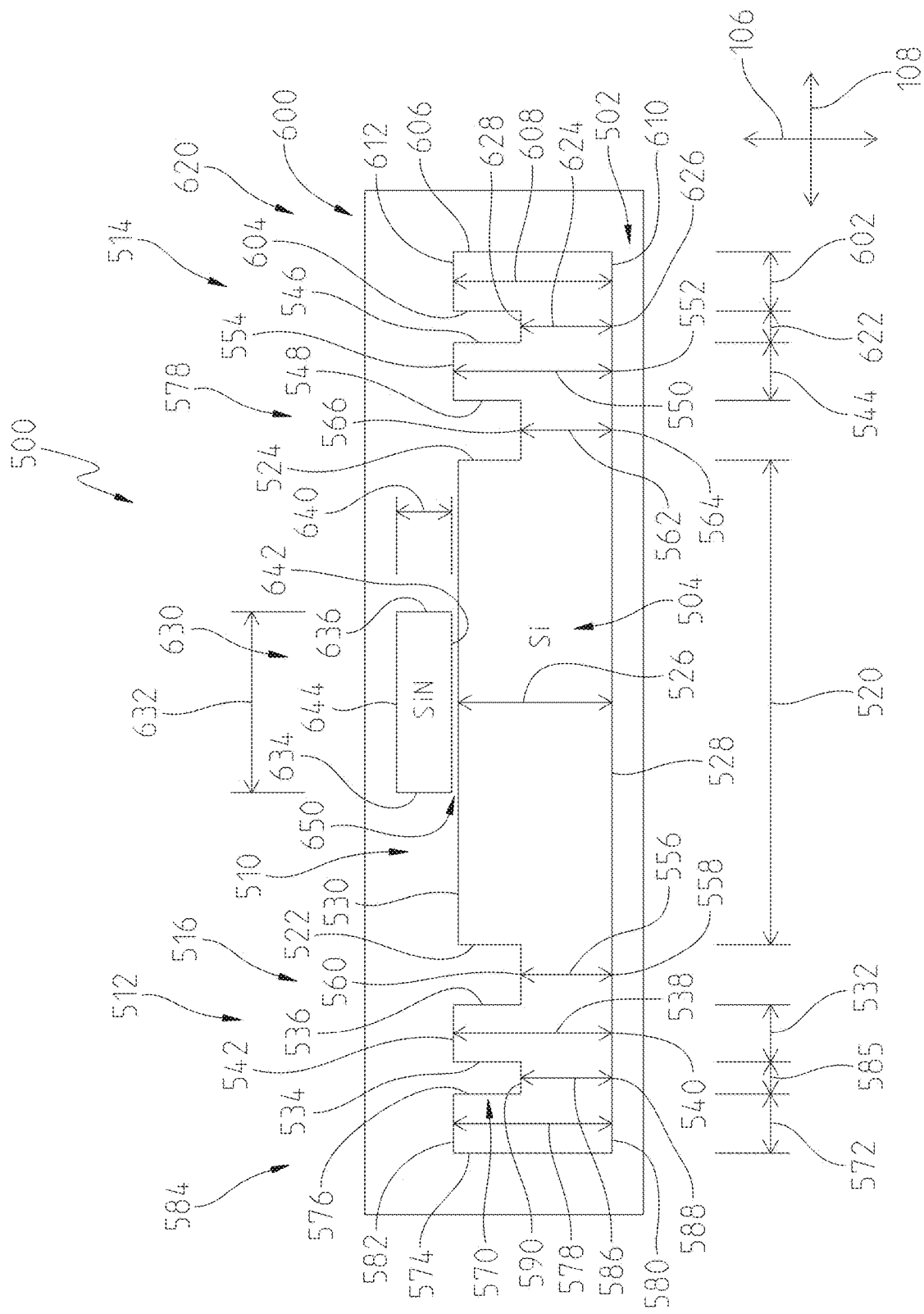
FIG. 7 illustrates a lateral cross-sectional view of a third exemplary optical waveguide of the present disclosure.

Referring to FIG. 7, a representative view of an optical waveguide 500 is illustrated. FIG. 7 is a lateral cross-sectional view of optical waveguide 500. Optical waveguide 500 includes a substrate 502 and silicon based optical waveguide 504 supported on substrate 502. silicon based optical waveguide 504 guides light (see the light intensity plot 700 in FIG. 8).

In embodiments, silicon based optical waveguide 504 is made from a first material selected from any suitable semiconductor material suitable to guiding optical radiation. Exemplary materials and dopants include Si, GaAs, LiNbO3, InP, AlGaAs, electro-optic polymer. Exemplary wavelengths of light compatible with the listed exemplary materials or other exemplary materials include 800-980 nm, 1260-1360 nm, 1530-1565 nm, and 1565-1670 nm. For the simulation shown in FIG. 8, the first material of silicon based optical waveguide 504 is Silicon and the surrounding material of substrate 502 is Silicon dioxide.

In embodiments, silicon based optical waveguide 504 has a constant lateral cross-section along a longitudinal length of optical waveguide 500. In embodiments, silicon based optical waveguide 504 has a varying lateral cross-section along a longitudinal length of optical waveguide 500. Exemplary varying lateral cross-sections include a tapered silicon based optical waveguide 504 which changes in a linear fashion in one or both of a vertical extent along axis 106 and a horizontal extent along axis 108. In examples, although the lateral cross-section of silicon based optical waveguide 504 varies, the proportions of the features of silicon based optical waveguide 504 remain the same throughout the longitudinal length of optical waveguide 500. In embodiments, silicon based optical waveguide 504 has at least one longitudinal portion having a constant lateral cross-section and at least one longitudinal portion having a varying lateral cross-section along a longitudinal length of optical waveguide 500.

Silicon based optical waveguide 504 includes a central ridge portion 510, a left wing ridge portion 512, a right wing ridge portion 514, a left connecting portion 516, and a right connecting portion 518. Left connecting portion 516 connects central ridge portion 510 and left wing ridge portion 512. Right connecting portion 518 connects central ridge portion 510 and right wing ridge portion 514. Central ridge portion 510 has a central ridge lateral width extent 520 bounded by a first central ridge sidewall 522 and a second central ridge sidewall 524 and a central ridge height extent 526 bounded by a central ridge bottom face 528 and a central ridge top face 530. Left wing ridge portion 512 has a left wing ridge lateral width extent 532 bounded by a first left wing sidewall 534 and a second left wing sidewall 536 and a left wing ridge height extent 538 bounded by a left wing ridge bottom face 540 and a left wing ridge top face 542. Right wing ridge portion 514 has a right wing ridge lateral width extent 544 bounded by a first right wing sidewall 546 and a second right wing sidewall 548 and a right wing ridge height extent 550 bounded by a right wing ridge bottom face 552 and a right wing ridge top face 554. Left connecting portion 116 has a left connecting portion height extent 556 bounded by a left connecting portion bottom face 558 and a left connecting portion top face 560. Right connecting portion 518 has a right connecting portion height extent 562 bounded by a right connecting portion bottom face 564 and a right connecting portion top face 566. Central ridge height extent 526 and left wing ridge height extent 538 are both greater than left connecting portion height extent 556 and central ridge height extent 526 and right wing ridge height extent 550 are both greater than right connecting portion height extent 562.

In embodiments, silicon based optical waveguide 504 terminates at first left wing sidewall 534 of left wing ridge portion 512 and first right wing sidewall 546 of right wing ridge portion 514. In the illustrated embodiment, central ridge bottom face 528, left wing ridge bottom face 540, right wing ridge bottom face 552, left connecting portion bottom face 558, and right connecting portion bottom face 564 form a planar bottom face of silicon based optical waveguide 504. In embodiments, one or more of left wing ridge bottom face 540, right wing ridge bottom face 552, left connecting portion bottom face 558, and right connecting portion bottom face 564 are offset from central ridge bottom face 528. In the illustrated embodiment, central ridge top face 530 and left wing ridge top face 542 are coplanar. Further, right wing ridge top face 554 and left wing ridge top face 542 are coplanar.

In the illustrated embodiment of FIG. 7, silicon based optical waveguide 504 includes additional wing portions, illustratively two additional wing portions. In embodiments, further additional wing portions are provided. In the illustrated embodiment of FIG. 7, silicon based optical waveguide 504 includes a second left wing ridge portion 570 having a second left wing ridge lateral width extent 572 bounded by sidewall 574 and sidewall 576 and a second left wing ridge height extent 578 bounded by a second left wing ridge bottom face 580 and a second left wing ridge top face 582. Second left wing ridge portion 570 is connected to left wing ridge portion 512 through a connecting portion 584 having a lateral extent 185 and a height extent 586 which is bounded by a bottom face 588 and a top face 590. Silicon based optical waveguide 504 further includes a second right wing ridge portion 600 having a second right wing ridge lateral width extent 602 bounded by sidewall 604 and sidewall 606 and a second right wing ridge height extent 608 bounded by a second left wing ridge bottom face 610 and a second left wing ridge top face 612. Second right wing ridge portion 600 is connected to right wing ridge portion 514 through a connecting portion 620 having a lateral extent 622 and a height extent 624 which is bounded by a bottom face 626 and a top face 628.

In the illustrated embodiment, left wing ridge height extent 538 and second left wing ridge height extent 578 are both greater than height extent 586 and right wing ridge height extent 550 and second right wing ridge height extent 608 are both greater than height extent 624. In the illustrated embodiment, left wing ridge top face 542 of left wing ridge portion 512 and second left wing ridge top face 582 of second left wing ridge portion 570 are coplanar. In embodiments, left wing ridge top face 542 of left wing ridge portion 512 is offset relative to second left wing ridge top face 582 of second left wing ridge portion 570. In the illustrated embodiment, right wing ridge top face 554 of right wing ridge portion 514 and second left wing ridge top face 612 of second right wing ridge portion 600 are coplanar. In embodiments, right wing ridge top face 554 of right wing ridge portion 514 is offset relative to second left wing ridge top face 612 of second right wing ridge portion 600. In the illustrated embodiment, second left wing ridge top face 582 of second left wing ridge portion 570 and second left wing ridge top face 612 of second right wing ridge portion 600 are coplanar. In embodiments, second left wing ridge top face 582 of second left wing ridge portion 570 is offset relative to second left wing ridge top face 612 of second right wing ridge portion 600.

In embodiments, a lateral separation between central ridge portion 510 and each of left wing ridge portion 512 and right wing ridge portion 514 is at least 250 nm. In embodiments, a lateral separation between each pair of left wing ridge portion 512 and second left wing ridge portion 570 and of right wing ridge portion 514 and second right wing ridge portion 600 is at least 100 nm.

Optical waveguide 500 further includes a concentrator 630 supported on substrate 502 and positioned within central ridge lateral width extent 520 of central ridge portion 510 and outside of central ridge height extent 526 of central ridge portion 510. Concentrator 630 has a lateral width extent 632 bounded by a sidewall 634 and a sidewall 636 and a height extent 640 bounded by a bottom face 642 and a top face 644. In embodiments, height extent 640 is in the range of 80-100 nanometers (nm). In embodiments, a ratio of central ridge lateral width extent 520 of central ridge portion 510 to lateral width extent 632 of concentrator 630 is greater than 1:1. In examples, the ratio is at least 2:1. In embodiments, concentrator 630 is patterned directly on top of silicon based optical waveguide 504. In the illustrated embodiment, concentrator 630 is spaced apart from central ridge portion 510 of silicon based optical waveguide 504 with a spacer layer 650. In embodiments, concentrator 330 has a thickness in the range of 200-400 nm and a width of 300-1000 nm.

Silicon based optical waveguide 504 is made of a first material while concentrator 630 is made of a second material, the second material being different than the first material. In the illustrated embodiment, silicon based optical waveguide 504 is made of Silicon (Si) and concentrator 630 is made of silicon nitride (SiN). Other exemplary materials may be used.

Concentrator 630 assists in concentrating the optical mode of silicon based optical waveguide 504 to the region generally directly below concentrator 630 as shown in light intensity plot 700. Concentrator 630 does not transport the optical energy itself. By concentrating the optical mode, the interactions with first central ridge sidewall 522 and second central ridge sidewall 524 of central ridge portion 510 of silicon based optical waveguide 504 is reduced. This lowers the free carrier generation rate and thus reduces power-dependent loss.

Figure 8:
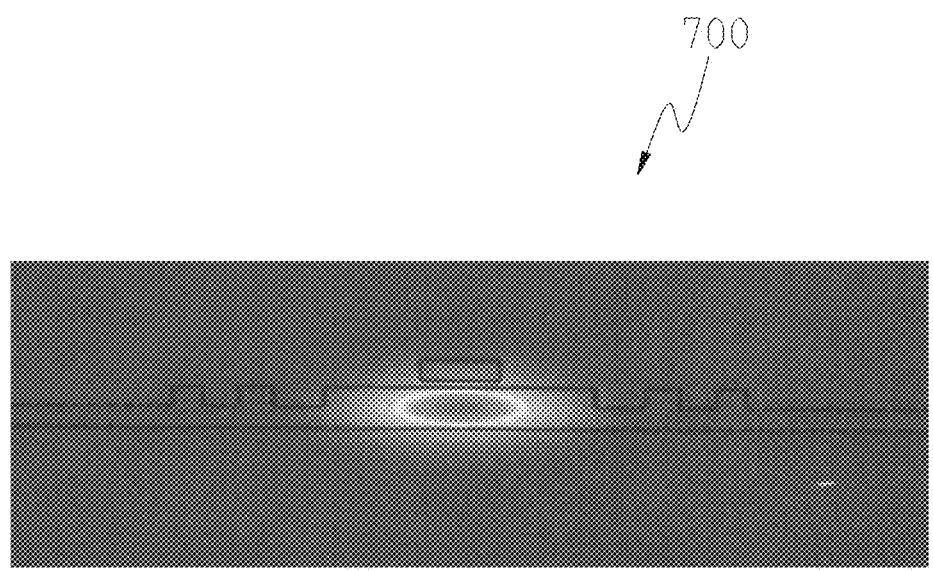
FIG. 8 illustrates a simulated lateral cross-sectional light intensity plot of light propagating along the length of the optical waveguide of FIG. 7.

Referring to FIG. 8, a simulated light intensity plot 700 for optical waveguide 500 is shown. As shown in light intensity plot 700, light is guided by central ridge portion 510 of optical waveguide 500. The geometry of optical waveguide 500 permits free carriers generated by surface states of optical waveguide 500 to diffuse over a large area. For example, left wing ridge portion 512 and right wing ridge portion 514 and optionally second left wing ridge portion 570 and second right wing ridge portion 600 provide a large surface area and volume over which generated carriers may diffuse away from the optical mode of central ridge portion 510 of silicon based optical waveguide 504; thereby reducing the carrier density near the optical mode. This geometry may also lead to a greater carrier recombination rate and a reduction in power-dependent loss.

Figure 9:
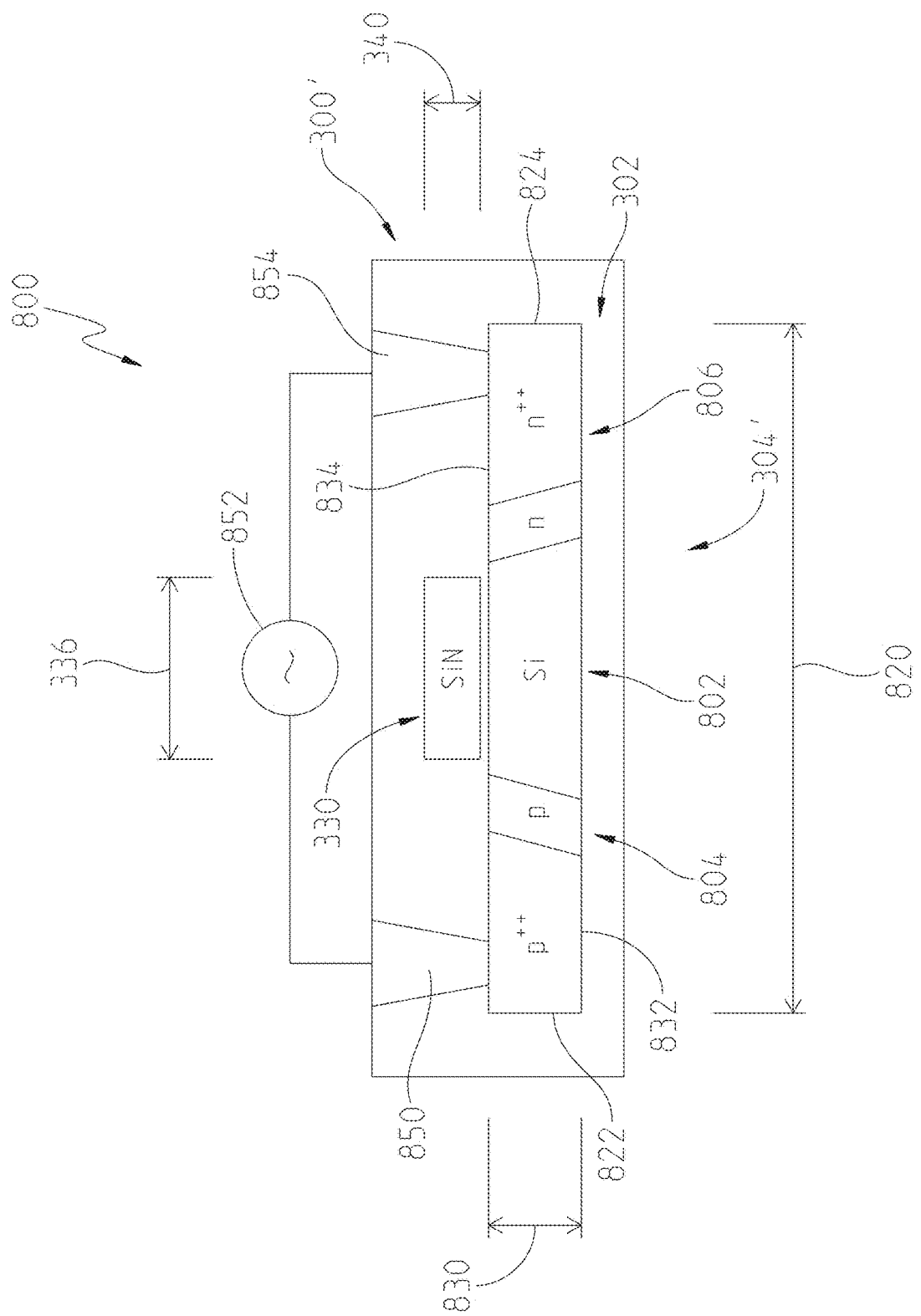
FIG. 9 illustrates a lateral cross-sectional view of an exemplary optical modulator of the present disclosure.

Referring to FIG. 9, an optical modulator 800 is represented. Optical modulator 800 includes a modified version of optical waveguide 300' including a modified silicon based optical waveguide 304'. Silicon based optical waveguide 304' includes a central optical guide portion 802 which carries the optical mode of optical modulator 800, a p-doped portion 804, and a n-doped portion 806. Silicon based optical waveguide 304' has a lateral width extent 820 bounded by a first sidewall 822 and a second sidewall 824 and a height extent 830 bounded by a bottom face 832 and a top face 834.

Optical waveguide 300' further includes a first electrical contact 850 adapted to operatively couple a radio frequency driver 852 to p-doped portion 804 of the silicon based optical waveguide 304', a second electrical contact 854 adapted to operatively couple radio frequency driver 852 to n-doped portion 806 of the silicon based optical waveguide 304', and concentrator 330 supported on substrate 302 and positioned within lateral width extent 820 of silicon based optical waveguide 304' and outside of height extent 830 of silicon based optical waveguide 304'. Concentrator 330 has a lateral width extent 332 and a height extent 340.

Optical modulator 800 receives an electrical drive signal from radio frequency driver 852 and light from a light source, such as a laser (not shown). Optical modulator 800 modulates the light propagating through central optical guide portion 802 of silicon based optical waveguide 304' with the electrical drive signal provided by radio frequency driver 852.

An advantage, among others, of the disclosed optical waveguides and modulators is a reduction in power-dependent optical loss due to a reduction in the optical mode interacting with the sidewalls of the waveguide material. An advantage, among others, of the disclosed optical waveguides and modulators is that they are fully compatible with existing silicon photonic fabrication processes. An advantage, among others, of the disclosed optical waveguides is that no external voltage needs to be applied to the waveguide. An advantage, among others, of the disclosed optical waveguides and modulators is the light remains highly confined in the structure. An advantage, among others, of the disclosed optical modulators is a reduction in the series resistance of the modulator compared to designs that rely on partially etched wings to confine the light thereby reducing the electrical power needed for the optical modulator.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

We claim:

1. An optical waveguide for carrying light comprising:
a substrate;
a silicon based optical waveguide supported on the substrate having a first lateral width extent bounded by a first sidewall and a second sidewall and a first height extent bounded by a first bottom face and a first top face, the silicon based optical waveguide being a first material; and
a concentrator supported on the substrate and positioned within the first lateral width extent of the silicon based optical waveguide and outside of the first height extent of the silicon based optical waveguide, the concentrator having a second lateral width extent bounded by a third sidewall and a fourth sidewall and a first height extent bounded by a second bottom face and a second top face, the concentrator being a second material different from the first material, the concentrator concentrates an optical mode of the silicon based optical waveguide to a region generally in the silicon based optical waveguide and having a lateral width in line with the second lateral width extent of the concentrator.

2. The optical waveguide of claim 1, wherein the concentrator is patterned on top of the silicon based optical waveguide.

3. The optical waveguide of claim 1, wherein the concentrator is separated from the silicon based optical waveguide by a spacer layer.

4. The optical waveguide of claim 1, wherein the first sidewall and the second sidewall are both etched sidewalls.

5. The optical waveguide of claim 1, wherein a ratio of the first lateral width extent of the silicon based optical waveguide to the second lateral width extent of the concentrator is greater than 1:1.

6. The optical waveguide of claim 5, wherein the ratio is at least 2:1.

7. The optical waveguide of claim 1, wherein the second material is silicon nitride.

8. The optical waveguide of claim 1, wherein the concentrator does not transport optical energy.

* * * * *